United States Patent
Takada et al.

(10) Patent No.: US 7,918,572 B2
(45) Date of Patent: Apr. 5, 2011

(54) INDICATOR DEVICE

(75) Inventors: Naoyuki Takada, Yokohama (JP);
Masaya Suzuki, Yokohama (JP);
Shinichi Sakano, Yokohama (JP);
Tomoyuki Nagahama, Yokohama (JP);
Mitsutaka Wasada, Yokohama (JP);
Takayuki Miyazawa, Yokohama (JP);
Yukihiro Handa, Yokohama (JP)

(73) Assignee: Victor Company of Japan, Limited, Yokohama-shi (JP)

( * ) Notice: Subject to any disclaimer, the term of this patent is extended or adjusted under 35 U.S.C. 154(b) by 78 days.

(21) Appl. No.: 12/320,871

(22) Filed: Feb. 6, 2009

(65) Prior Publication Data

US 2009/0237910 A1    Sep. 24, 2009

(30) Foreign Application Priority Data

Mar. 18, 2008  (JP) ................. 2008-069850

(51) Int. Cl.
*F21V 7/04* (2006.01)
(52) U.S. Cl. .................... 362/23; 362/311.01; 362/603; 362/612
(58) Field of Classification Search ........... 362/311.01–311.12, 800, 603, 362/612, 613
See application file for complete search history.

(56) References Cited

U.S. PATENT DOCUMENTS

| 6,805,456 | B2 * | 10/2004 | Okuwaki ............... 362/626 |
| 7,448,787 | B2 * | 11/2008 | Kim et al. ............... 362/620 |
| 2002/0141174 | A1 | 10/2002 | Parker et al. |

FOREIGN PATENT DOCUMENTS

| JP | 2000-149635 | 5/2000 |
| JP | 2007-184191 | 7/2007 |

OTHER PUBLICATIONS

Official Action issued on May 11, 2010, in the counterpart Chinese application.

* cited by examiner

*Primary Examiner* — Anabel M Ton
(74) *Attorney, Agent, or Firm* — The Nath Law Group; Jerald L. Meyer; Jonathan A. Kidney

(57) ABSTRACT

An indicator device includes a light emitting element for emitting light, and a light conducting plate having a light incidence surface for conducting light from the light emitting element inside thereof and a light output surface, for a lighted indication by the light output surface. The light conducting plate has a triangular recess recessed to form with prescribed recess depths in one planer surface thereof, for light from the light emitting element to be reflected in part. The triangular recess has a recess extremity constituting a single vertex disposed in position on an optical axis of the light emitting element and nearer to the light incidence surface than other end parts thereof. The recess depths becomes shallower as the V-form recess extends from the recess extremity, allowing for an evenness of luminance of light over the light output surface formed on the light conducting plate.

6 Claims, 11 Drawing Sheets

OUTPUT LIGHT INTENSITY CHARACTERISTIC OF LED

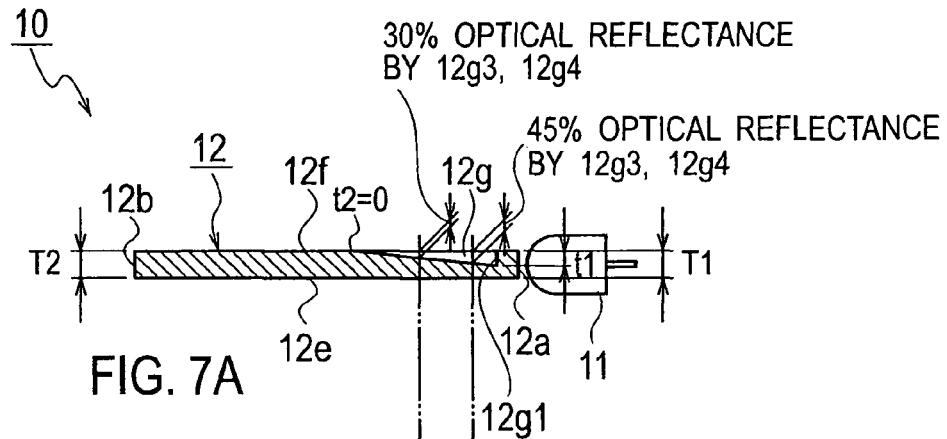
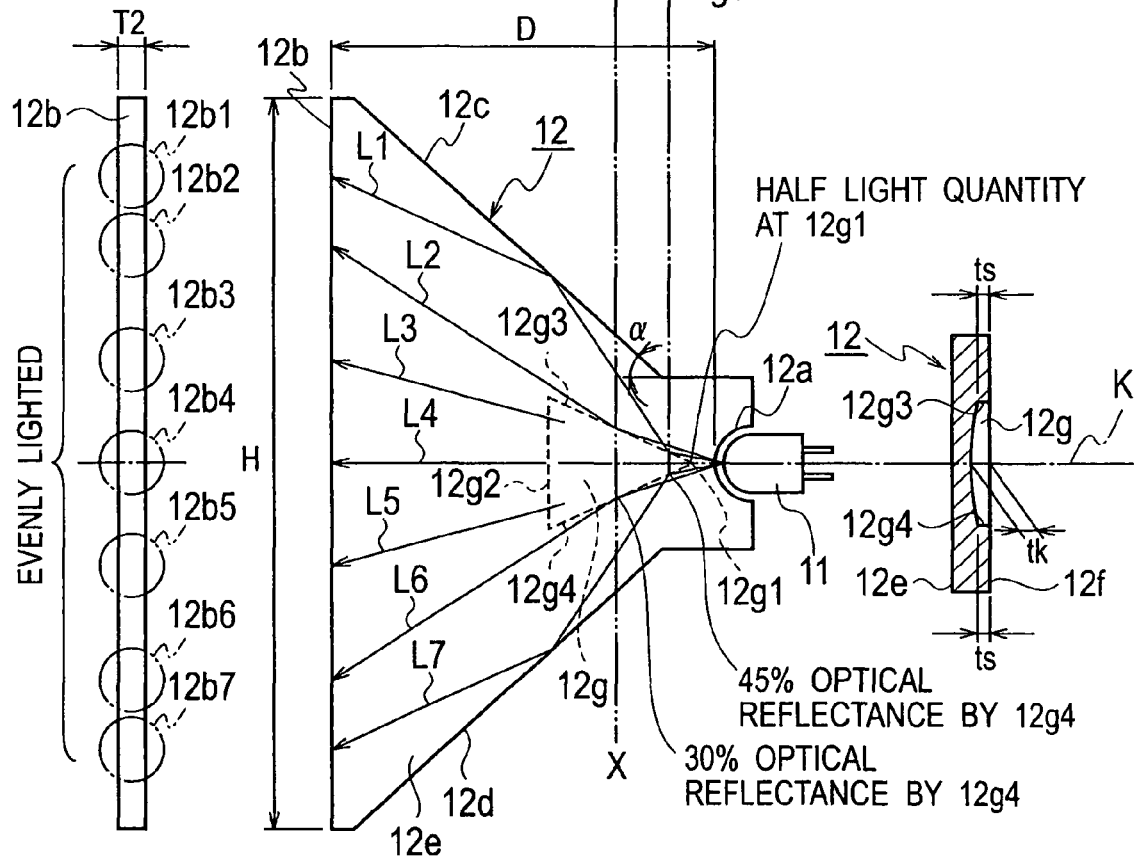
FIG. 7A  FIG. 7B  FIG. 7C  FIG. 7D

INDICATOR DEVICE

BACKGROUND OF THE INVENTION

1. Field of the Invention

The present invention relates to an indicator device in which output light from a light emitting element is let to strike on a light incidence surface formed on a side face of a light conducting plate, where it is conducted inside the light conducting plate, and is let to outgo through a light output surface formed narrow in width and elongate on another side face having a prescribed spaced position relative to the light incidence surface, thereby allowing for the light output surface to be clearly lighted for indication, with a secured evenness of luminance of light over the light output surface.

2. Description of the Related Art

Generally, the indicator device as well as the illumination device is configured with a light emitting element using an LED (light emitting diode), lamp, or such, and a light conducting plate using a transparent acrylic resin, polycarbonate resin, or such, making output light from the light emitting element strike on a light incidence surface of the light conducting plate, where it is conducted inside the light conducting plate, and is let to go outside from a light output surface, for applications to a lighted indication, illumination, etc.

As such type of indicator devices, there are those to be fixed to a front panel of an electronic device, for a lighted indication of an operated state of the electronic device (refer to the first patent document "Japanese Patent Application Laid-Open Publication No. 2007-184191", for example).

Further, as such type of illumination devices, there are surface illumination devices to be used as a backlight for liquid crystal display panels (refer to the second patent document "Japanese Patent Application Laid-Open Publication No. 2000-149635", for example).

FIG. 1 is a side view of an indicator device 110 as a first example in the past, FIG. 2A, a top view of a surface illumination device 120 as a second example in the past, and FIG. 2B, a longitudinal sectional view of the surface illumination device 120.

Brief description is now made of the indicator device 110 illustrated in FIG. 1, which is disclosed in the first patent document.

As shown in FIG. 1, the indicator device 110 is fixed to a front panel 111 of an electronic device, to provide a lighted indication of an operated state of the electronic device.

The indicator device 110 includes a wiring board 112 with an LED 113 mounted thereon, the LED 113 facing a light incidence surface 114a at an end of a light conducting lens 114, which is formed, using a flexible material such as a vinyl chloride resin, in a polygonal or circular shape in section and bent substantially in an L form. The light conducting lens 114 has a reflecting surface 114b formed at another end thereof having a spaced position at a prescribed distance D relative to the light incidence surface 114a, the other end being bent in the L form, and a light output surface 114c formed at a far end thereof that faces a display window 111a of the front panel 111.

A bridge member 115 interconnects the LED 113 and the light conducting lens 114 with each other, the light conducting lens 114 being supported near the far end by a planer solid member 116 welded to a boss 111b of the front panel 111.

The light conducting lens 114 made of a transparent flexible material is adapted for the light incidence surface 114a to be variable in position relative to the LED 113, allowing for a sufficiently high light intensity at the display window 111a of the front panel 111.

Brief description is now made of the surface illumination device 120 illustrated in FIGS. 2A and 2B, which is disclosed in the second patent document.

As shown in FIGS. 2A and 2B, the surface illumination device 120 is used as a backlight of a liquid crystal display panel 126.

The surface illumination device 120 includes an LED light source 122 disposed inside a holder 121, in a lower region thereof at the side of a side face 123a of a light conducting plate 123 made of a highly transparent material such as a polycarbonate resin or acrylic resin. The light conducting plate 123 is provided with a reflection sheet 124 attached to a downside 123b thereof, and a diffusion sheet 125 attached to an upside 123c thereof, the diffusion sheet 125 having the liquid crystal display panel 126 mounted thereon.

The light conducting plate 123 has, at the medial side of the side face 123a, a light diffusion hole 123d formed as a through hole or concave hole on an optical axis K of the LED light source 122, whereby rays of light output from the LED light source 122 are separated into rays of light totally reflected by a circumferential surface of the light diffusion hole 123d in the light conducting plate 123 and rays of light passing through a central region or near of the light diffusion hole 123d, so that rays of light taken into the light conducting plate 123 are transversely diffused to thereby provide a homogenized luminance distribution, allowing for the liquid crystal display panel 126 to be evenly illuminated with rays of light output from the diffusion sheet 125, including those having passed through the light conducting plate 123 and those having been reflected by the diffusion sheet 125.

In the indicator device 110, output light from the LED 113 is let to strike on the light incidence surface 114a of the light conducting plate 114 bent substantially in an L form, where it is conduced inside the light conducting plate 114, via the light reflecting surface 114b, and is let to outgo through the light output surface 114c, whereby output light from the light output surface 114c can be displayed in the display window 114a of the front panel 111, as a lighted indication in a polygonal form or circular form in accordance with the shape in section of the light output surface 114c. However, there are some developed situations in which it is desirable, in the viewpoint of a design to the front panel 111, to form the light output surface 114c of the light conducting plate 114 with an arrow and elongate shape different from the above, and in such a case, for the light conducting plate 114 which is made of a flexible material, it would result in a discrepancy in strength to form a narrow and elongate surface for a lighted indication by using the flexible material.

There thus has been a desideratum for an indicator device having such a narrow and elongate surface for a lighted indication as shown in FIG. 3A, FIG. 3B, or FIG. 4 below.

FIG. 3A is a perspective view of a light output surface of an indicator device 130 as a third example in the past, FIG. 3B, a perspective view of the indicator device 130, FIG. 4, a perspective view of an indicator device 140 as a fourth example in the past, and FIG. 5, a graph showing an output light intensity characteristic of a typical LED.

As shown in FIG. 3A and FIG. 3B, the indicator device 130 is configured with an LED 131, and a light conducting plate 132 made in a planer form by using a transparent acrylic resin or the like, such that output light from the LED 131 is let to strike on a light incidence surface 132a made in a semi-circular form on a side face of the light conducting plate 132, where it is conducted inside the light conducting plate 132, and is let to outgo through a light output surface 132b made narrow in width and elongate on another side face having a spaced position at a prescribed distance D relative to the light incidence surface 132a, to thereby implement a favorable lighted indication in the viewpoint of a design in application of the light output surface 132b of the light conducting plate 132 to a front panel of an electronic device (not shown).

However, for the indicator device 130, as generally shown in FIG. 5, output light of LED 131 has substantially an elliptically-deformed circular characteristic in light intensity, whereby output light from the LED 131 is substantially elliptically spread in the light conducting plate 132, as illustrated by broken lines about an optical axis K of the LED 131 as a center, so that the light output surface 132b, which is made narrow in width and elongate in the light conducting plate 132 made in a planer form, would be lighted for indication to be light within a vicinity of a longitudinal center thereof, and would be lighted for indication to be dark in vicinities of both longitudinal ends of the light output surface 132b.

It is noted that FIG. 3A illustrates a light outputting state of the light output surface 132b formed on the light conducting plate 132 that is separated into light and dark regions defined with a boundary line in between for descriptive purposes, while typically the brightness is gradually changed.

On the other hand, as shown in FIG. 4, the indicator device 140 is configured with an LED 141, and a light conducting plate 142 made substantially in an L-bent form by using a transparent acrylic resin or the like, such that output light from the LED 141 is let to strike on a light incidence surface 142a made in a semi-circular form on a side face of the light conducting plate 142, where it is conducted inside the light conducting plate 142 and reflected by a reflecting surface 142b made on another side face having a spaced position at a prescribed distance D relative to the light incidence surface 142a, and thereafter, is let to outgo through a light output surface 142c made narrow in width and elongate on the end face of a portion of the L-bent form at the end of the other side face, to thereby implement a favorable lighted indication in the viewpoint of a design in application of the light output surface 142c of the light conducting plate 142 to a front panel of an electronic device (not shown).

However, also for the indicator device 140, like the above, output light of LED 141 has substantially an elliptically-deformed circular characteristic in light intensity, whereby output light from the LED 141 is substantially elliptically spread in the light conducting plate 142, as illustrated by broken lines about an optical axis K of the LED 141 as a center, so that the light output surface 142c, which is made narrow in width and elongate in the light conducting plate 142 made substantially in an L-bent form, would be lighted for indication to be light within a vicinity of a longitudinal center thereof, and would be lighted for indication to be dark in vicinities of both longitudinal ends of the light output surface 142c.

It is noted that FIG. 4 illustrates a light outputting state of the light output surface 142c formed on the light conducting plate 142 that is separated into light and dark regions defined with a boundary line in between for descriptive purposes, while typically the brightness is gradually changed.

As a solution to problems that would outcome in application of the indicator device 130 or the indicator device 140, there might be a method of applying a technical concept of the indicator device 120 having been described with reference to FIG. 2A and FIG. 2B, so that the light conducting plate 132 or 142 might have a light diffusion hole (not shown) formed therein as a through hole or concave hole on the optical axis K of the LED 131 or 141, respectively. However, for rays of light output from the LED 131 or 141, it is quite unclear, among others, how much they might be reflected and how much they might be blocked by the light diffusion hole, there being involved uncertainties for the light output surface 132b or 142c, which is made narrow in width and elongate in the light conducting plate 132 or 142, respectively, to be evenly lighted for indication in vicinities of both longitudinal ends thereof with substantially the same brightness as in a vicinity of the longitudinal center, constituting a difficulty to provide the indicator device 130 or 140 with a favorable quality of lighted indication.

SUMMARY OF THE INVENTION

The present invention is devised in view of the foregoing points, and it is its object to provide an indicator device in which output light from a light emitting element is let to strike on a light incidence surface formed on a side face of a light conducting plate, where it is conducted inside the light conducting plate, and is let to outgo through a light output surface formed narrow in width and elongate on another side face having a prescribed spaced position relative to the light incidence surface, thereby allowing for the light output surface to be clearly lighted for indication, with a secured evenness of luminance of light over the light output surface.

According to a first aspect of the present invention, as a solution to the object, an indicator device comprises a light emitting element configured for emission of light, and a light conducting plate comprising a light incidence surface formed at on a side face opposite to the light emitting element and configured for light from the light emitting element to strike thereon, a light output surface formed on another side face having a prescribed spaced position relative to the light incidence surface to be narrow in width and elongate in a direction perpendicular to an optical axis of the light emitting element and configured for light having income to outgo for a lighted indication, and a V-form recess recessed to form with prescribed recess depths in one planer surface of two planer surfaces intersecting at right angles with the side face between the light incidence surface and the light output surface and configured for light from the light emitting element to be reflected in part, the V-form recess having a recess extremity constituting a single vertex thereof disposed in position on the optical axis of the light emitting element and nearer to the light incidence surface than other end parts thereof, and the recess depths becoming shallower as the V-form recess extends from the recess extremity.

According to a second aspect of the present invention, in the indicator device according to the first aspect, the V-form recess is formed in a V form defined with recess side walls as two sides thereof interconnecting the recess extremity and the other end parts, respectively, the recess side walls having recess depths becoming smaller as the recess side walls extend from the recess extremity.

According to a third aspect of the present invention, in the indicator device according to the first aspect, the light output surface is formed on an end part of a bent portion bent in an L form at an end of the other side face having the prescribed spaced position relative to the light incidence surface of the light conducting plate.

According to a fourth aspect of the present invention, in the indicator device according to the first aspect, the light output surface comprises one of a flat surface made longitudinally flat, a concave curved surface made longitudinally concave with a prescribed curvature, and a convex curved surface made longitudinally convex with a prescribed curvature.

According to a fifth aspect of the present invention, in the indicator device according to the first aspect, the V-form recess is configured to block more light from the light emitting element, as being closer to the optical axis, and reflect a greater light quantity of light reflected and conducted toward the light output surface, as being reflected and conducted farer from the optical axis at the light output surface.

According to a sixth aspect of the present invention, in the indicator device according to the first aspect, the V-form recess is a triangular recess.

BRIEF DESCRIPTION OF THE DRAWINGS

FIG. 7A is a sectional view along an optical axis of the indicator device according to the first embodiment of the present invention.

FIG. 7B is a left side view of the indicator device according to the first embodiment.

FIG. 7C is a front view of the indicator device according to the first embodiment.

FIG. 7D is a sectional view along a line X of FIG. 7C.

DESCRIPTION OF THE EMBODIMENTS

There will be described into details indicator devices according to first and second embodiments of the present invention, respectively, with reference to FIG. 6A to FIG. 15B.

First Embodiment

Figure 6A:
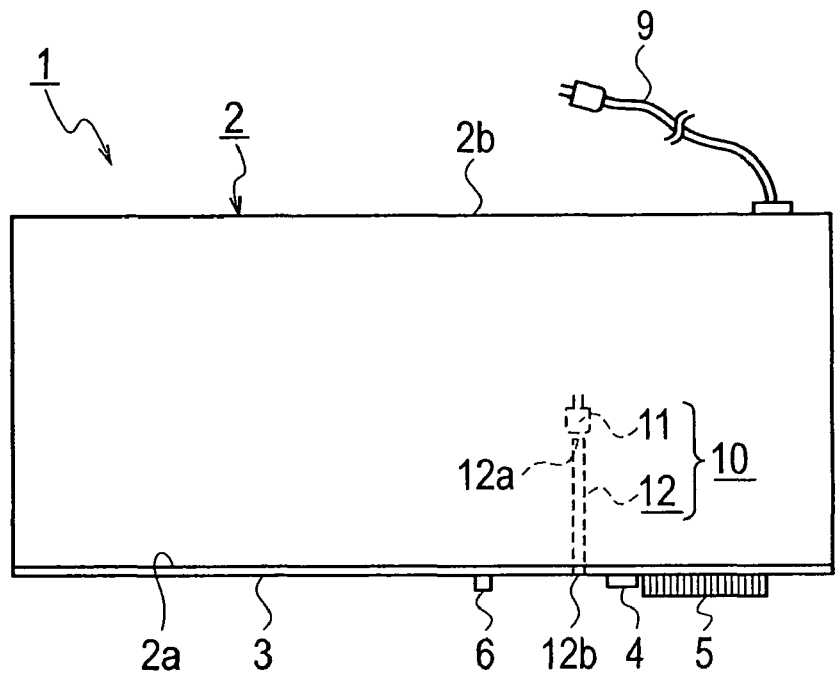
FIG. 6A is a top view of an electronic device implemented with an indicator device according to a first embodiment of the present invention.
Figure 6B:
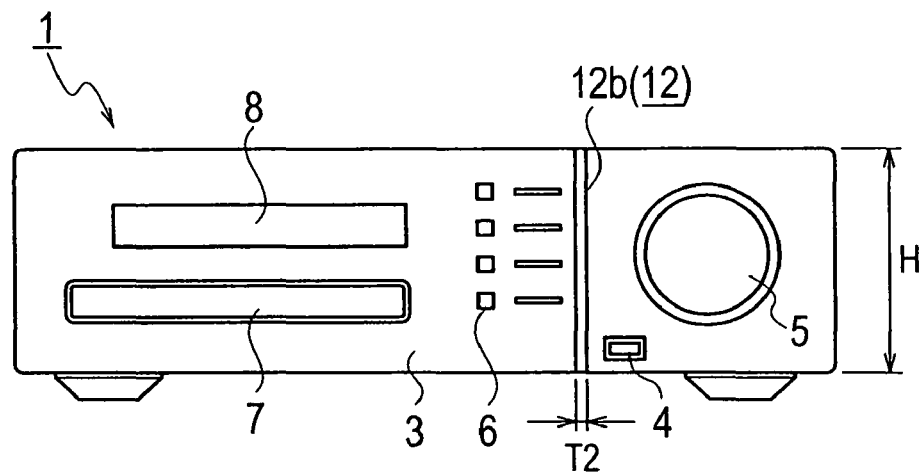
FIG. 6B is a front view of the electronic device implemented with the indicator device according to the first embodiment.
Figure 8A:
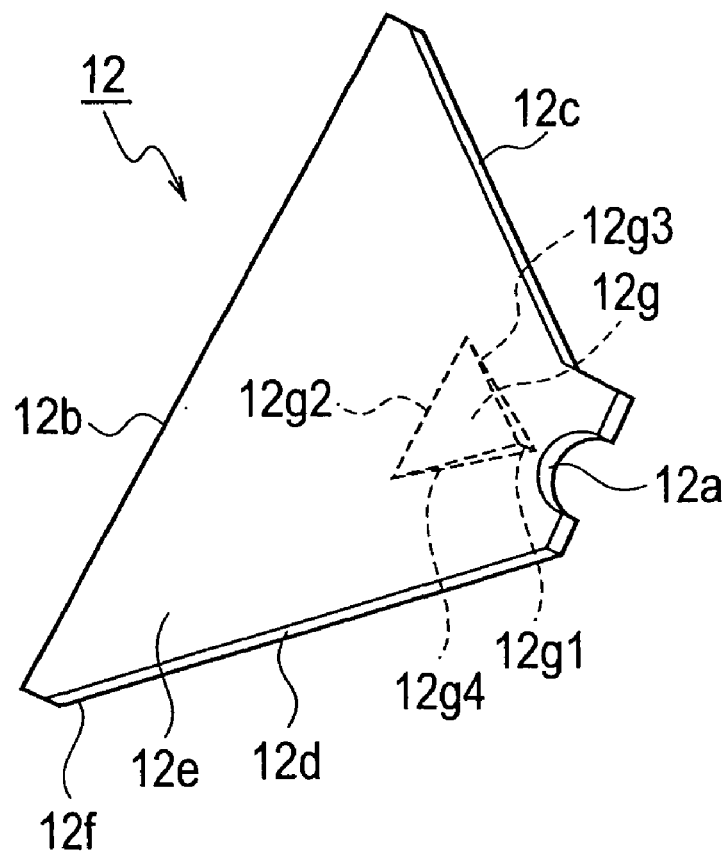
FIG. 8A is a perspective view of an upside of a light conducting plate constituting an essential portion of the indicator device according to the first embodiment of the present invention.

FIG. 6A is a top view of an electronic device 1 implemented with an indicator device 10 according to the first embodiment of the present invention, and FIG. 6B, a front view of the same. FIG. 7A is a sectional view along an optical axis of the indicator device 10, FIG. 7B, a left side view of the indicator device 10, FIG. 7C, a front view of the indicator device 10, and FIG. 7D, a sectional view along a line X of FIG. 7C. FIG. 8A is a perspective view of an upside of a light conducting plate 12 constituting an essential portion of the indicator device 10, and FIG. 8B, a perspective view of a downside of the light conducting plate 12.

As shown in FIG. 6A and FIG. 6B, the indicator device 10 according to the first embodiment is made up by a light emitting element 11 using an LED (referred herein to "LED 11"), and a light conducting plate 12 made planer by using a transparent acrylic resin, polycarbonate resin, or the like, for conducting therein light emitted from the LED 11. The LED 11 may be any one that can be deemed as a single light source, and may be e.g. a polychromatic LED in which a plurality of LEDs are assembled together.

The indicator device 10 according to the first embodiment is applied to a front panel 3 fixed to a font side 2a of a chassis 2 of an electronic device 1, such as an AV (audio-visual) equipment for instance, for a lighted indication of an operated state of the electronic device to be favorable in view of a design.

It is noted that the indicator device 10 according to the first embodiment has applications not restricted simply to electronics 1 such as AV equipment, but addressed also to, among others, operation panels of various electronics, instrument panels in automobiles, or such.

The electronic device 1 such as an AV equipment has, on the front panel 3 fixed to the font side 2a of the chassis 2, a power supply button 4, a volume control 5, a variety of operational buttons 6, an optical disc insertion slot 7, a liquid crystal panel 8, etc., and for a lighted indication of an on state of the power supply button 4, the indicator device 10 according to the first embodiment is fixed on the front panel 3, near the power supply button 4. A power supply cord 9 is attached to a backside 2b of the chassis 2.

For the indicator device 10 according to the first embodiment, the LED 11 is facing a light incidence surface 12a formed on one side face of the light conducting plate 12, and as shown in FIG. 6B, the light conducting plate 12 is fixed inside the chassis 2 substantially at right angles to a backside of the front panel 3, so the front panel 3 has a light output surface 12b substantially vertically exposed thereon, which is formed on another side face having a prescribed spaced position relative to the light incidence surface 12a, to be narrow in width and elongate in the vertical direction.

The light output surface 12b of the light conducting plate 12, substantially vertically exposed on the front panel 3, has a narrow width T2, and an elongate height H of a substantially identical dimension to a height of the front panel 3.

For an on state of the power button 4, emitted light from the LED 11, in red for example, is let to strike on the light incidence surface 12a of the light conducting plate 12, where it is conducted inside the light conducting plate 12, and is let to outgo through the light output surface 12b spaced at a prescribed distance relative to the light incidence surface 12a and formed narrow in width and elongate, thereby lighting the light output surface 12b for a clear indication, so that the light output surface 12b constituting a surface for a lighted indication can be distinct as a design, and an evenness of luminosity of light can be secured within the light output surface 12b, as will be described later on.

Description is now made of specific configuration of the indicator device 10 according to the first embodiment, with reference to FIGS. 7A, 7B, 7C, and 7D.

Figure 5:
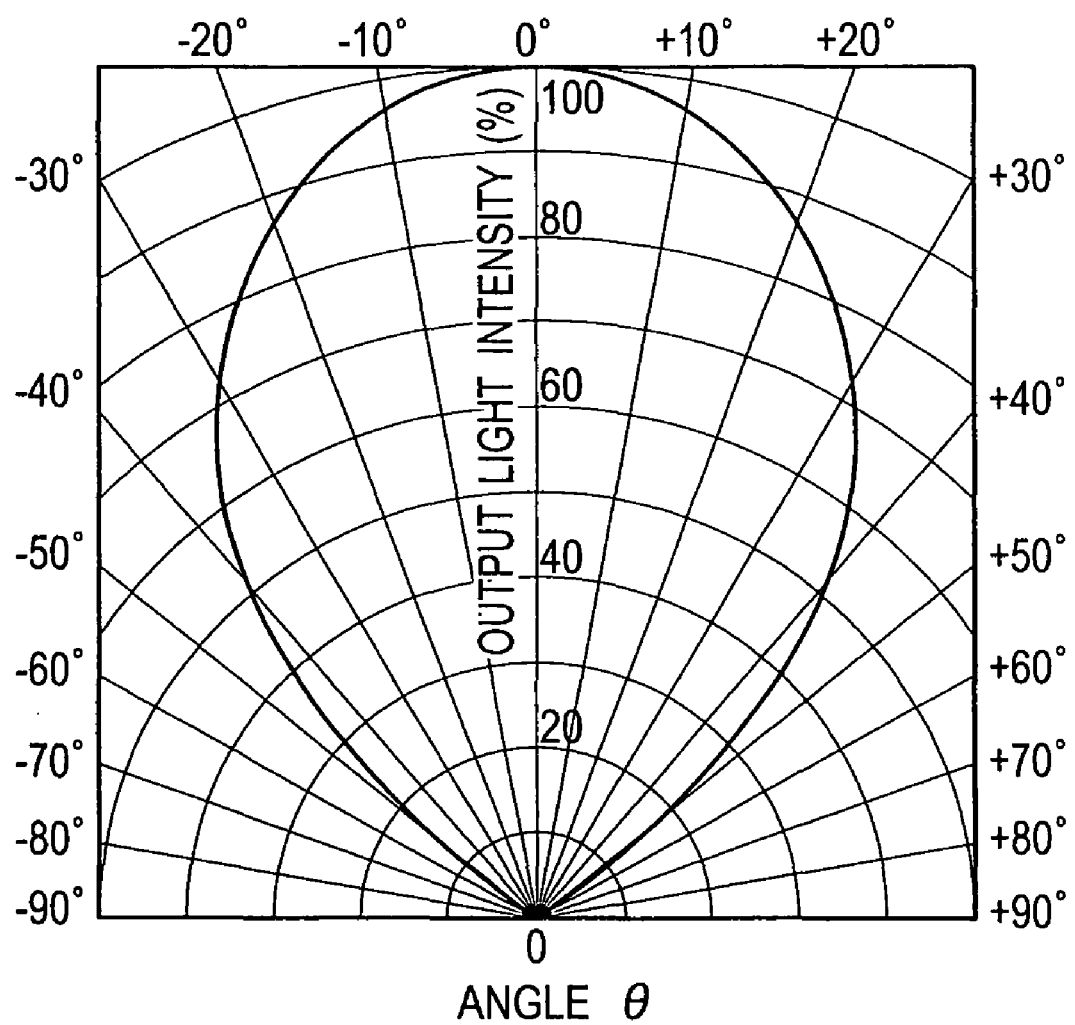
FIG. 5 is a graph showing an output light intensity characteristic of a typical LED.

The LED 11 is driven, with the power button 4 (FIG. 6A, FIG. 6B) in an on state, for emission of light, in red for example, substantially in an elliptically-deformed circular pattern based on the output light intensity characteristic shown in FIG. 5.

The light conducting plate 12 constituting an essential portion of the first embodiment is made by using an acrylic resin for example, in the form of a planer polygon, more specifically, substantially in a triangular plate form.

As shown in FIG. 7C, the light incidence surface 12a is semi-circularly recessed to form on a right side face (as one side face) of the light conducting plate 12, and the LED 11 is arranged opposite to the light incidence surface 12a, the LED 11 having an optical axis K vertically centrally set to intersect at right angles with the light output surface 12b.

Relative to the light incidence surface 12a formed on the right side face (as one side face) of the light conducting plate 12, on a left side face (as another side face) having a spaced position at a prescribed distance D therefrom, the light output surface 12b is formed as a flat surface narrow in width and elongate in a vertical direction perpendicular to the optical axis K of the LED 11, while the prescribed distance D is set to a value permitting emitted light from the LED 11 to be diffused inside the light conducting plate 12, the prescribed distance D being set to 42 mm or near, for example.

The light output surface 12b formed on the left side face (as the other side face) of the light conducting plate 12 has a thickness T2 set to be thinner than a thickness T1 of the light incidence surface 12a formed on the right side face (as one side face) of the light conducting plate 12, so that for rays of light having been emitted from the LED 11 and income through the light incidence surface 12a and outgoing though the light output surface 12b, flux of light can be narrowed in the light conducting plate 12 for a clear lighted indication.

The thickness T1 of the light incidence surface 12a is set to 3.7 mm for example, and the thickness T2 of the light output surface 12b, to 3.5 mm for example, the thickness T2 of the light output surface 12b giving a width of the surface to be lighted by the light conducting plate 12 for indication on the front panel 3 (FIGS. 6A and 6B).

The height H of the light conducting plate 12 is set to a dimension approximately equal to the height of the front panel 3 (FIGS. 6A and 6B), it being set to 8.2 mm for example.

The light conducting plate 12 has a pair of upper and lower inclined side faces 12c and 12d formed to be vertically symmetric about the optical axis K of the LED 11, as a pair of flat sloping surfaces equilateral-triangularly inclined at inclination angles α to have height-directional dimensions gradually increased as the light conducting plate 12 extends from the light incidence surface 12a toward the light output surface 12b. The inclination angles α that the upper and lower inclined side faces 12c and 12d of the light conducting plate 12 have to the optical axis K of the LED 11 are set to 45° or near for example, substantially in accord with an outside emission angle where the LED 11 has an approximately half light intensity of output light intensity characteristic.

The light conducting plate 12 has two surfaces intersecting at right angles with the right side face (as one side face) and the left side face (as the other side face), which constitute an upside 12e and a downside 12f each respectively formed as a flat planer surface.

The light conducting plate 12 has therein a triangular recess 12g recessed to form with recess depths within a thickness between the above-noted two sides being the upside 12e and the downside 12f, in one of the two sides 12e and 12f, e.g. the downside 12f, constituting a planer surface between the light incidence surface 12a and the light output surface 12b, for partially blocking and reflecting light from the LED 11 in accordance with the output light intensity characteristic (FIG. 5) of the LED 11, and directions in which rays of light from the LED 11 strike toward the light output surface 12b, and the triangular recess 12g is disposed on the optical axis K of the LED 11, close to the light incidence surface 12a.

The triangular recess 12g recessed to form in the downside 12f of the light conducting plate 12 is formed as an essential portion of the first embodiment to partially block and reflect light of the LED 11 having income through the light incidence surface 12a, for light to be output from the light output surface 12b with a secured evenness of luminosity.

It is noted that light of the LED 11 having income through the light incidence surface 12a of the light conducting plate 12 has a fraction thereof passing inside the triangular recess 12g, which however is so small as negligible.

The triangular recess 12g recessed to form in the downside 12f of the light conducting plate 12 is formed to be vertically symmetric about the optical axis K of the LED 11, and as an equilateral-triangular recess.

The triangular recess 12g has a recess extremity 12g1 constituting a single vertex thereof disposed, as shown in FIGS. 7A and 7C, in position on the optical axis K of the LED 11 and nearer to the light incidence surface 12a than other vertices thereof, the recess extremity 12g1 being formed with a recess depth t1, and the triangular recess 12g has recess depths thereof made gradually shallower, as it extends from the recess extremity 12g1 toward an opposite side 12g2 thereof set, on the light output side, opposite to the recess extremity 12g1, at a distance off therefrom, till it has a zero depth t2 on the opposite side 12g2. In other words, the triangular recess 12g has, between the recess extremity 12g1 and the opposite side 12g2, an inside bottom thereof formed as a recess with an inclination to the direction of optical axis.

For the triangular recess 12g, the recess depth t1 at the recess extremity 12g1 is set in advance to a value that halves the light quantity of light from the LED 11 striking on the recess extremity 12g1 on the optical axis K of the LED 11.

More specifically, the recess depth t1 at the recess extremity 12g1 is preset to a value around half the thickness T1 at the light incidence surface 12a.

The triangular recess 12g recessed to form in the downside 12f of the light conducting plate 12 thus has recess depths t gradually decreasing in ratio (=t/T) to a thickness T of the light conducting plate 12, as it extends from the light incidence surface 12a side to the light output surface 12b side.

The triangular recess 12g has, as shown in FIG. 7C, two sides thereof being upper and lower recess side walls 12g3 and 12g4 respectively interconnecting the recess extremity 12g1 and the opposite side 12g2, and as shown in FIGS. 7A and 7C, the upper and lower recess side walls 12g3 and 12g4 are formed triangular, respectively, to have their optical reflectance values gradually decreased in proportion to recess depths, as they extend from the recess extremity 12g1, which has the recess depth t1, to the opposite side 12g2, which is formed opposite thereto at a distance off therefrom, with the recess depth t2 being a zero.

Further, for the triangular recess 12g, as shown in FIG. 7D that is a sectional view along the line X, the inside bottom is recessed to form in an arcuate shape, so the triangular recess 12g has therein, at an arbitrary position on the optical axis K of the LED 11, a recess depth tk a little deeper than respective recess depths ts of upper and lower recess side walls 12g3 and 12g4 corresponding thereto on both sides, thereby allowing for the upper and lower recess side walls 12g3 and 12g4 to have adjustable optical reflectance values, as will be described later on, while without restriction thereto it also is possible to have recess depths ts set equal to the recess depth tk.

In other words, for the upper and lower recess side walls 12g3 and 12g4, their recess depths at both sides in a vicinity of the recess extremity 12g1 are made substantially maximal, though shallower than at the recess extremity 12g1, and have maximal optical reflection values, which are set in the first embodiment to 45% or near for example, whereto the recess depths are set about 0.45T1 for the thickness T1 of the light incidence surface 12a, and the recess side walls 12g3 and 12g4 have gradually decreased optical reflection values, as they extend to the opposite side 12g2.

Figure 8B:
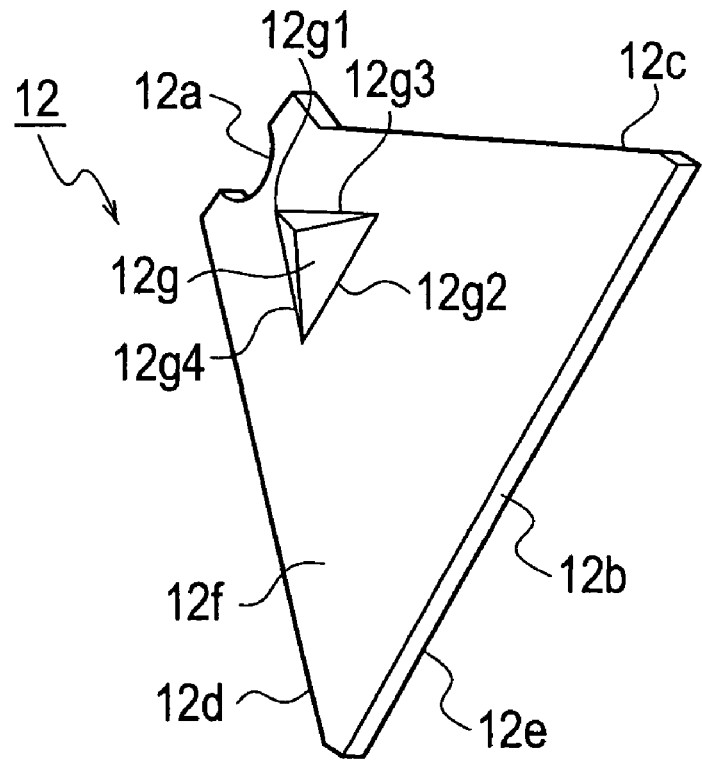
FIG. 8B is a perspective view of a downside of the light conducting plate according to the first embodiment.

The light conducting plate 12 is formed as described above, and looks as shown in FIG. 8A in a view of the upside 12e, or as shown in FIG. 8B in a view of the downside 12f.

Description is now made of functions of the indicator device 10 according to the first embodiment, with reference to FIGS. 7A to 7D.

Among rays of light emitted from the LED 11, rays L4 of light paraxial to the optical axis K of the LED 11 are strongest in light intensity, as will be seen from the output light intensity characteristic shown in FIG. 5 as well. Those rays L4 of light income, past the light incidence surface 12a of the light conducting plate 12, in position at the recess extremity 12g1 of the triangular recess 12g, where rays L4 of light greatest in light intensity are partly blocked from passing therethrough, and are halved in light quantity by the recess extremity 12g1, and remaining as-halved rays L4 of light (else than having struck on the recess extremity 12g1) pass along the optical axis K of the LED 11, through a portion at the side of the upside 12e in the back of the triangular recess 12g, to light a longitudinally central region 12b4 of the light output surface 12b.

Among rays of light emitted from the LED 11, vertically symmetric outer rays L1 and L7 of light are once reflected by local regions of the upper and lower recess side walls 12g3 and 12g4 of the triangular recess 12g having their optical reflectance values preset to 45% for example, respectively, to strike toward the upper and lower inclined side faces 12c and 12d, and are reflected by the upper and lower inclined side faces 12c and 12d toward the light output surface 12b, to light corresponding regions 12b1 and 12b7 in vicinities of both longitudinal ends of the light output surface 12b, respectively.

Among rays of light emitted from the LED 11, inner rays L2 and L6 of light relative to vertically symmetric outer rays L1 and L7 of light are reflected by local regions of the upper and lower recess side walls 12g3 and 12g4 of the triangular recess 12g having their optical reflectance values preset to 30% for example, respectively, and light corresponding local regions 12b2 and 12b6 at the inner sides of the regions 12b1 and 12b7 of the light output surface 12b, respectively.

Among rays of light emitted from the LED 11, inner rays L3 and L5 of light relative to inner rays L2 and L6 of light pass through corresponding portions at the side of the upside 12e in the back of the triangular recess 12g, without striking inside the triangular recess 12g, to light corresponding local regions 12b3 and 12b5 at the inner sides of the regions 12b2 and 12b6 of the light output surface 12b, respectively.

Figure 1:
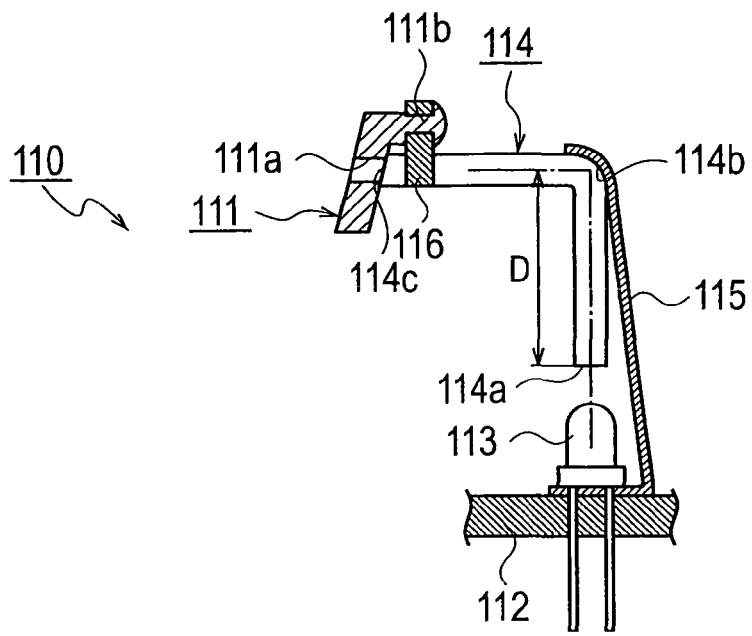
FIG. 1 is a side view of an indicator device as a first example in the past.
Figure 2A:
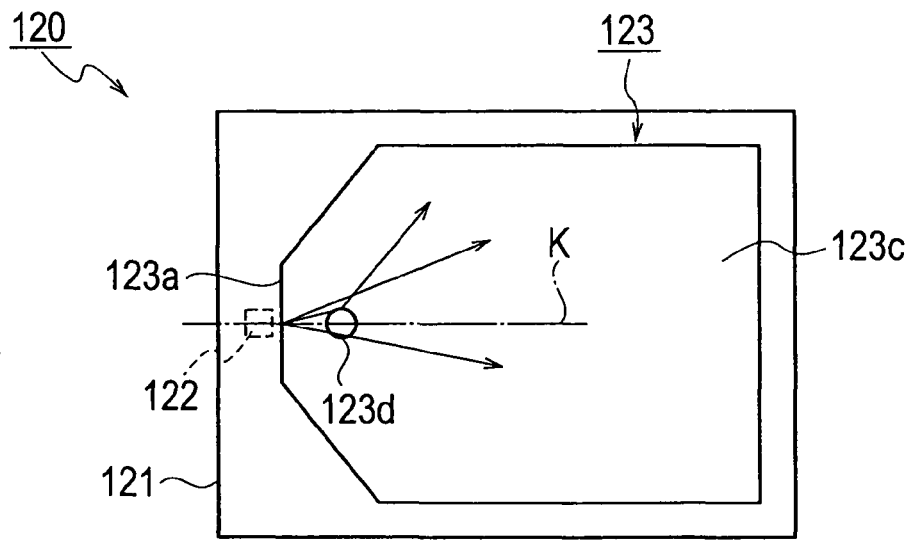
FIG. 2A is a top view of a surface illumination device as a second example in the past.
Figure 2B:
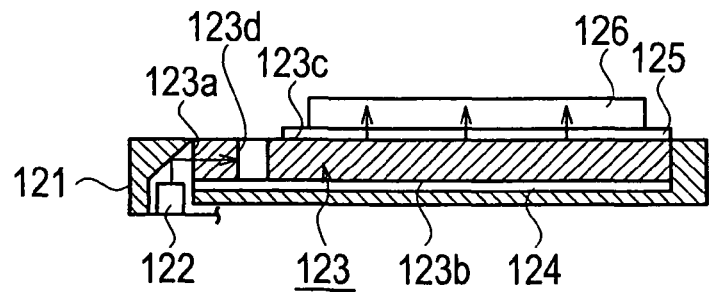
FIG. 2B is a longitudinal sectional view of the surface illumination device as the second example in the past.
Figure 3A:
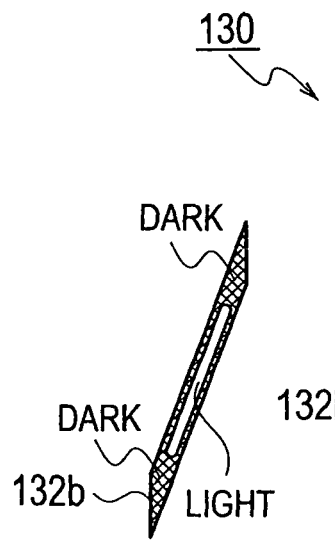
FIG. 3A is a perspective view of a light output surface of an indicator device as a third example in the past.
Figure 3B:
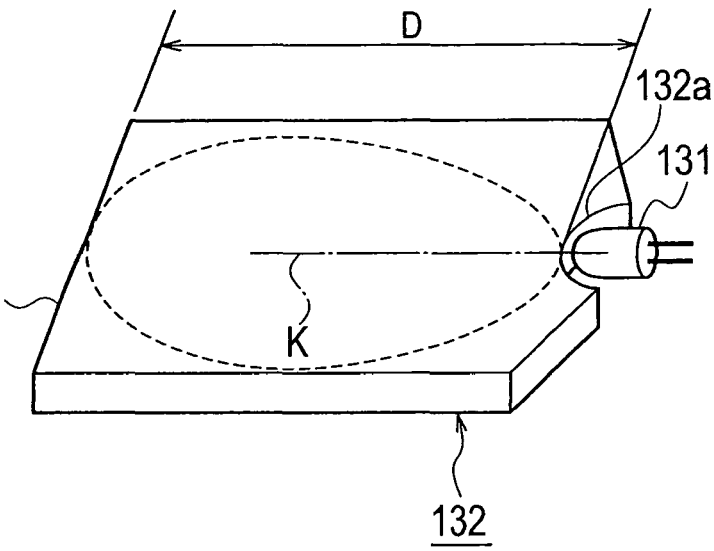
FIG. 3B is a perspective view of the indicator device as the third example in the past.
Figure 4:
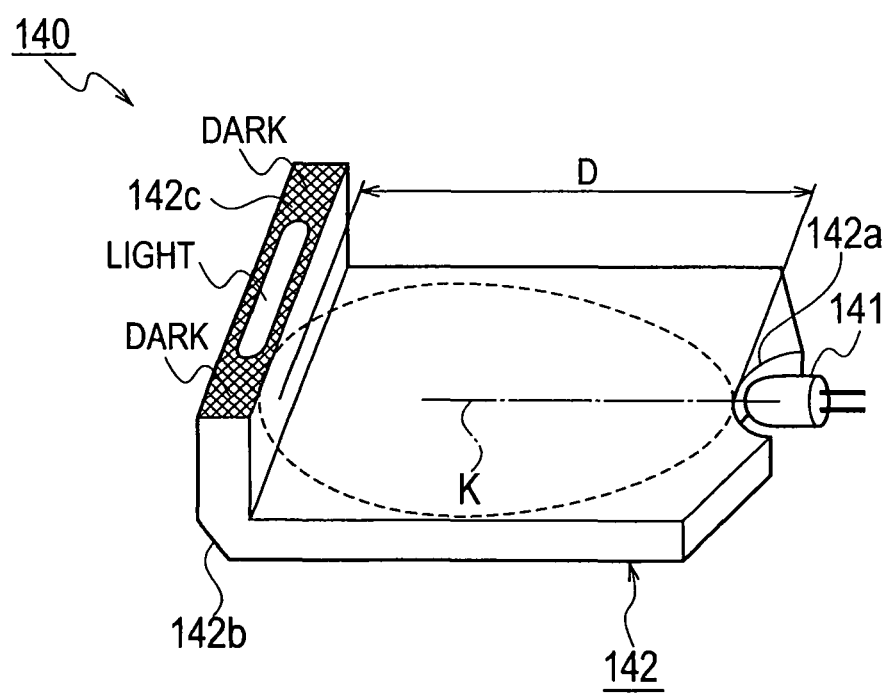
FIG. 4 is a perspective view of an indicator device as a fourth example in the past.

Those rays L1 to L7 of light described are emitted from the LED 11 in accordance with an output light intensity characteristic illustrated by using FIG. 5, but in unison with the output light intensity characteristic, those rays L1 to L7 of light are blocked to reflect in part by the triangular recess 12g formed in the light conducting plate 12, thereby permitting the light output surface 12b to gleam for a lighted indication substantially with an even brightness without optical spots, encompassing respective longitudinal regions 12b1 to 12b7 of the light output surface 12b, thus preventing occurrences of a phenomenon on the light output surface 12b, where this would get dark in vicinities of both longitudinal ends thereof as was observed in the third and the fourth example in the past described with reference to FIGS. 3A and 3B and FIG. 4, that is, allowing for a secured evenness of luminosity of light over the light output surface 12b, together with provision of the indicator device 10 according to the first embodiment with a favorable quality of lighted indication in respect of a design, as well.

It is noted that the opposite side 12g2 of recess 12g can do without extending straight, and may be arcuate, for example. More specifically, the recess 12g may well be any V form recess defined by a pair of recess side walls 12g3 and 12g4 extending in mutually crossing directions from the recess extremity 12g1 as a common end part thereof, and a bottom wall of an arbitrary configuration for interconnection therebetween, and oriented to have the recess extremity 12g1 located nearer to the light incidence surface 12a, in terms of a distance along an associated optical axis, than two end parts of the V form, i.e., the other end parts of the recess side walls 12g3 and 12g4.

Figure 9:
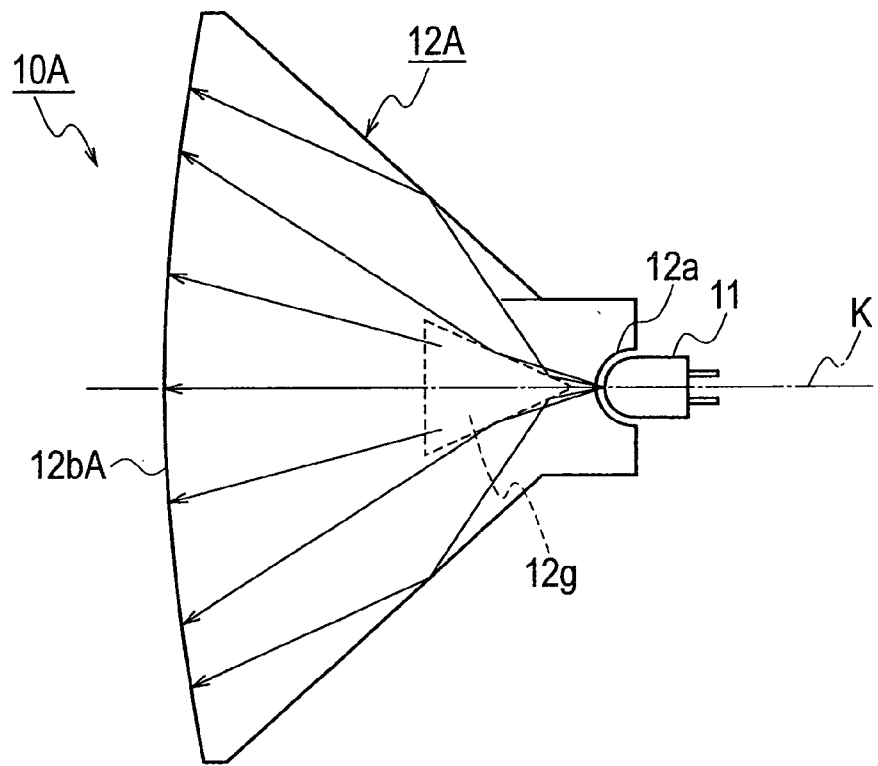
FIG. 9 is a front view of an indicator device according to a first modification as a partial modification of the first embodiment of the present invention.
Figure 10:
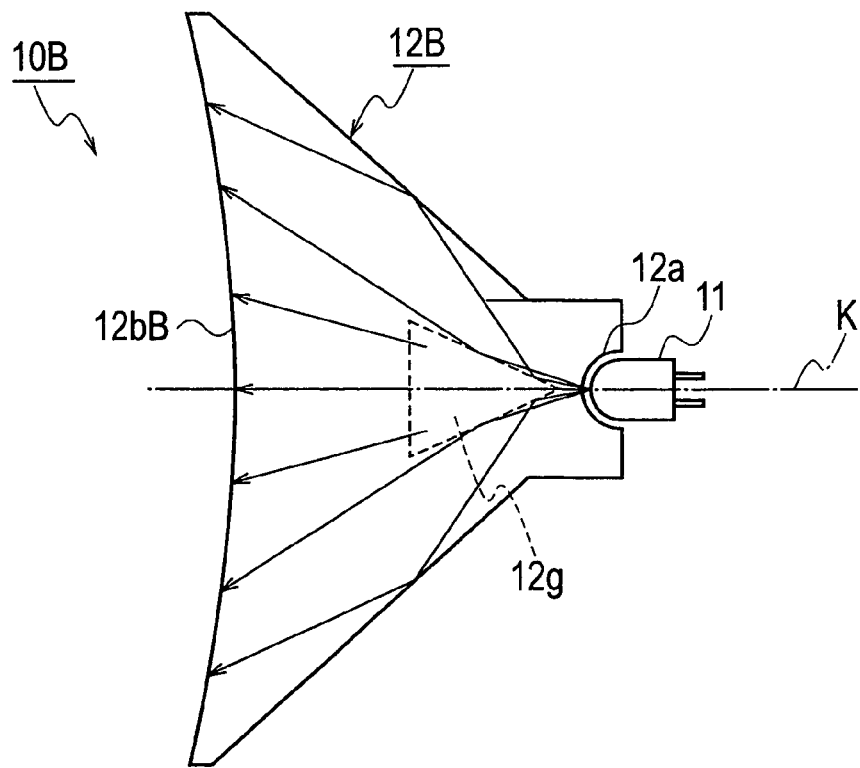
FIG. 10 is a front view of an indicator device according to a second modification as a partial modification of the first embodiment of the present invention.

Description is now made of a first and a second modification as partial modifications of the first embodiment of the present invention, with reference to FIG. 9 and FIG. 10.

FIG. 9 is a front view of an indicator device 10A according to the first modification as a partial modification of the first embodiment, and FIG. 10, a front view of an indicator device 10B according to the second modification as a partial modification of the first embodiment.

As shown in FIG. 9, the indicator device 10A according to the first modification as a partial modification of the first embodiment is made up by an LED 11, and a light conducting plate 12A made planer by using a transparent acrylic resin, polycarbonate resin, or the like, for conducting therein light emitted from the LED 11. The first modification is different from the first embodiment simply in that the light conducting plate 12A has a light output surface 12bA configured as a convex curved surface made in a convex form with a prescribed curvature along a longitudinal direction thereof. The convex curved surface has a center thereof set on a longitudinal centerline of the light conducting plate 12A.

As shown in FIG. 10, the indicator device 10B according to the second modification as a partial modification of the first embodiment is made up by an LED 11, and a light conducting plate 12B made planer by using a transparent acrylic resin, polycarbonate resin, or the like, for conducting therein light emitted from the LED 11. The second modification is different from the first embodiment simply in that the light conducting plate 12B has a light output surface 12bB configured as a concave curved surface made in a concave form with a prescribed curvature along a longitudinal direction thereof. The concave curved surface has a center thereof set on a longitudinal centerline of the light conducting plate 12B.

The indicator device 10A according to the first modification, as well as the indicator device 10B according to the second modification, as a partial modification of the first embodiment has like functions to the first embodiment, thereby allowing for a secured evenness of luminosity of light over the light output surface 12bA made as a convex curved surface in the light conducting plate 12A, as well as over the light output surface 12bB made as a concave curved surface in the light conducting plate 12B.

Second Embodiment

Figure 11A:
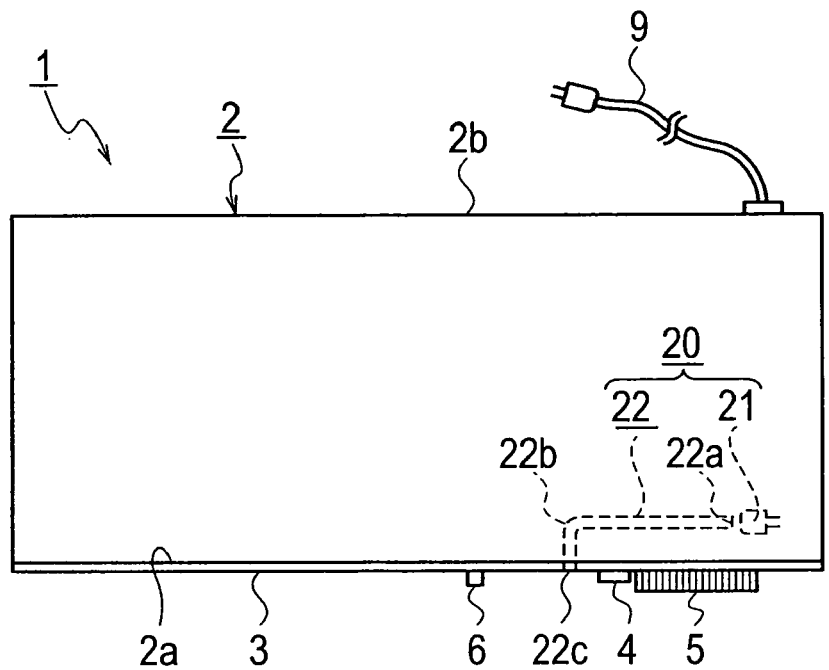
FIG. 11A is a top view of an electronic device implemented with an indicator device according to a second embodiment of the present invention.
Figure 11B:
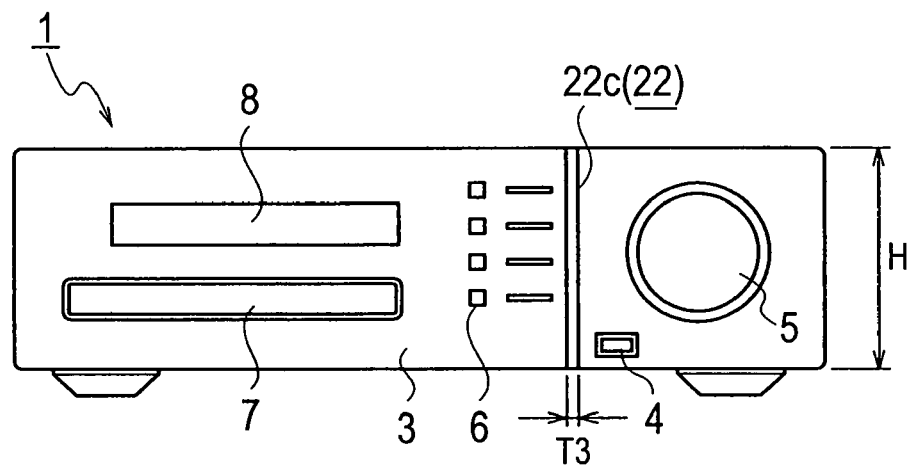
FIG. 11B is a front view of the electronic device implemented with the indicator device according to the second embodiment.
Figure 12A:
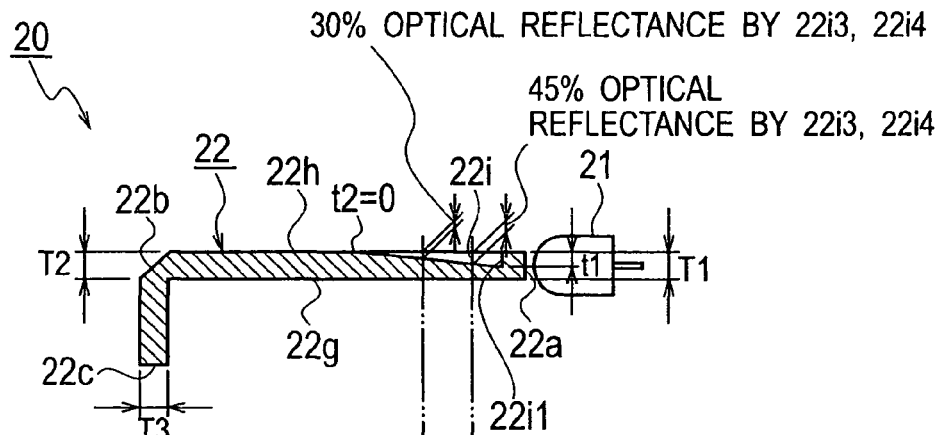
FIG. 12A is a sectional view along an optical axis of the indicator device according to the second embodiment of the present invention.

FIG. 11A is a top view of an electronic device 1 implemented with an indicator device 20 according to the second embodiment of the present invention, and FIG. 11B, a front view of the same. FIG. 12A is a sectional view along an optical axis of the indicator device 20, FIG. 12B, a front view of the indicator device 20, and FIG. 12C, a sectional view along a line X of FIG. 12B. FIG. 13A is a perspective view of an upside of a light conducting plate 22 constituting an essential portion of the indicator device 20, and FIG. 13B, a perspective view of a downside of the light conducting plate 22.

As shown in FIG. 11A and FIG. 11B, the indicator device 20 according to the second embodiment is made up by a light emitting element 21 using an LED (referred herein to "LED 21"), and a light conducting plate 22 made substantially in an L form by using a transparent acrylic resin, polycarbonate resin, or the like, for conducting therein light emitted from the LED 21. The LED 21 may be any one that can be deemed as a single light source, and may be e.g. a polychromatic LED in which a plurality of LEDs are assembled together.

The indicator device 20 according to the second embodiment also is applied to a front panel 3 fixed to a font side 2a of a chassis 2 of an electronic device 1, such as an AV equipment for instance, for a lighted indication of an operated state of the electronic device to be favorable in view of a design.

It is noted that the indicator device 20 according to the second embodiment also has applications not restricted simply to electronics 1 such as AV equipment, but addressed also to, among others, operation panels of various electronics, instrument panels in automobiles, or such.

Like the first embodiment, the electronic device 1 such as an AV equipment has, on the front panel 3 fixed to the font side 2a of the chassis 2, a power supply button 4, a volume control 5, a variety of operational buttons 6, an optical disc insertion slot 7, a liquid crystal panel 8, etc., and for a lighted indication of an on state of the power supply button 4, unlike the first embodiment, the indicator device 20 according to the second embodiment is fixed on the front panel 3, near the power supply button 4. A power supply cord 9 is attached to a backside 2b of the chassis 2.

For the indicator device 20 according to the second embodiment, the LED 21 is facing a light incidence surface 22a formed on one side face of the light conducting plate 22, and as shown in FIG. 11B, a reflecting surface 22b is formed on another side face having a prescribed spaced position relative to the light incidence surface 22a. And, the light conducting plate 22 is fixed inside the chassis 2 to a backside of the front panel 3, substantially in an L form oriented toward the volume control 5, so the front panel 3 has a light output surface 22c substantially vertically exposed thereon, which is formed on an end of a portion bent substantially in an L form at the end of the other side face, to be narrow in width and elongate in the vertical direction.

The light output surface 22c of the light conducting plate 22, substantially vertically exposed on the front panel 3, has a narrow width T3, and an elongate height H of a substantially identical dimension to a height of the front panel 3.

For an on state of the power button 4, emitted light from the LED 21, in red for example, is let to strike on the light incidence surface 22a formed on one side face of the light conducting plate 22, where it is conducted inside the light conducting plate 22, and reflected by the reflecting surface 22b formed on the other side face having a spaced position at a prescribed distance relative to the light incidence surface 22a, and thereafter, is let to outgo through the light output surface 22c formed narrow in width and elongate on the end of the portion bent substantially in an L form at the end of the other side face, whereby the light output surface 22c is lighted for a clear indication, so that the light output surface 22c constituting a surface to be lighted for indication can be distinct as a design, and an evenness of luminosity of light can be secured within the light output surface 22c, as will be described later on.

Figures 12B, 12C:
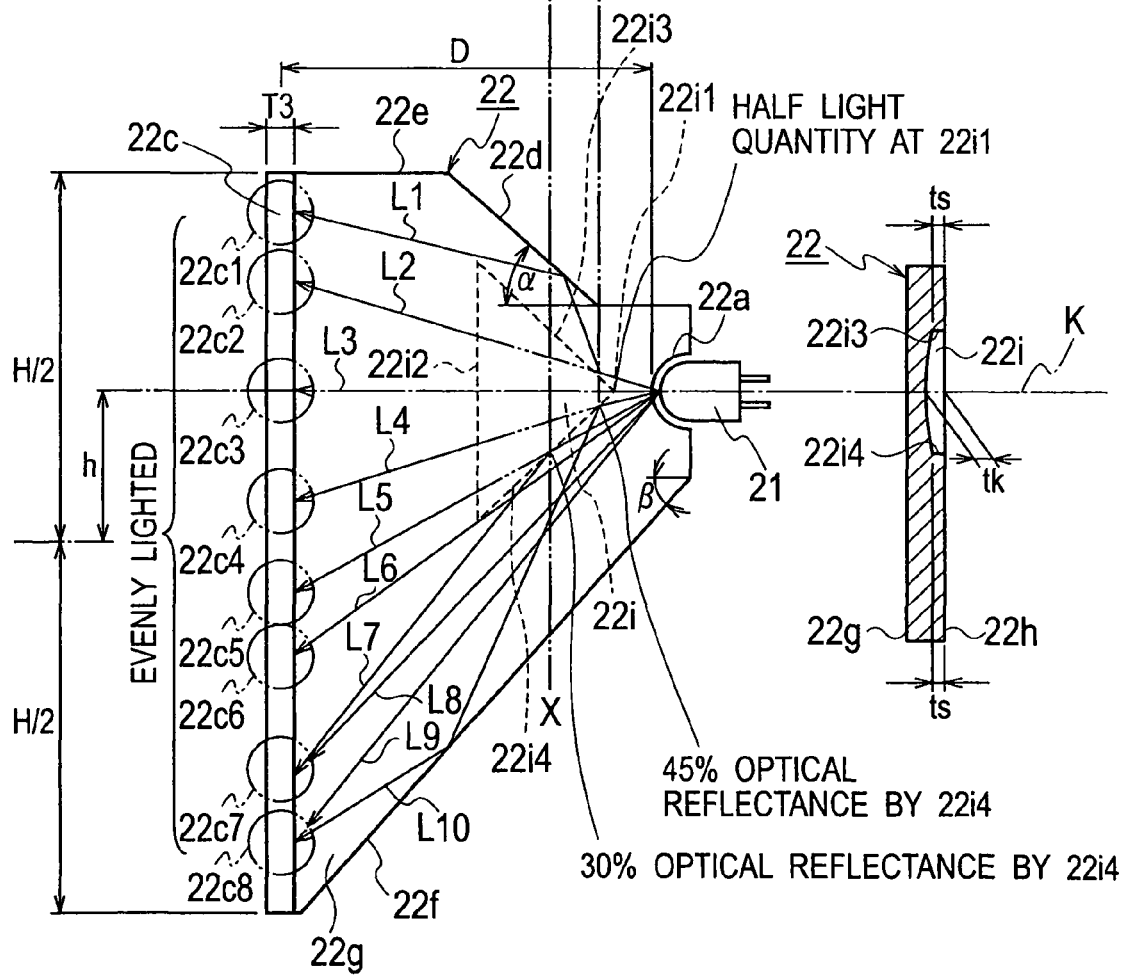
FIG. 12B is a front view of the indicator device according to the second embodiment.
FIG. 12C is a sectional view along a line X of FIG. 12B.
Figure 13A:
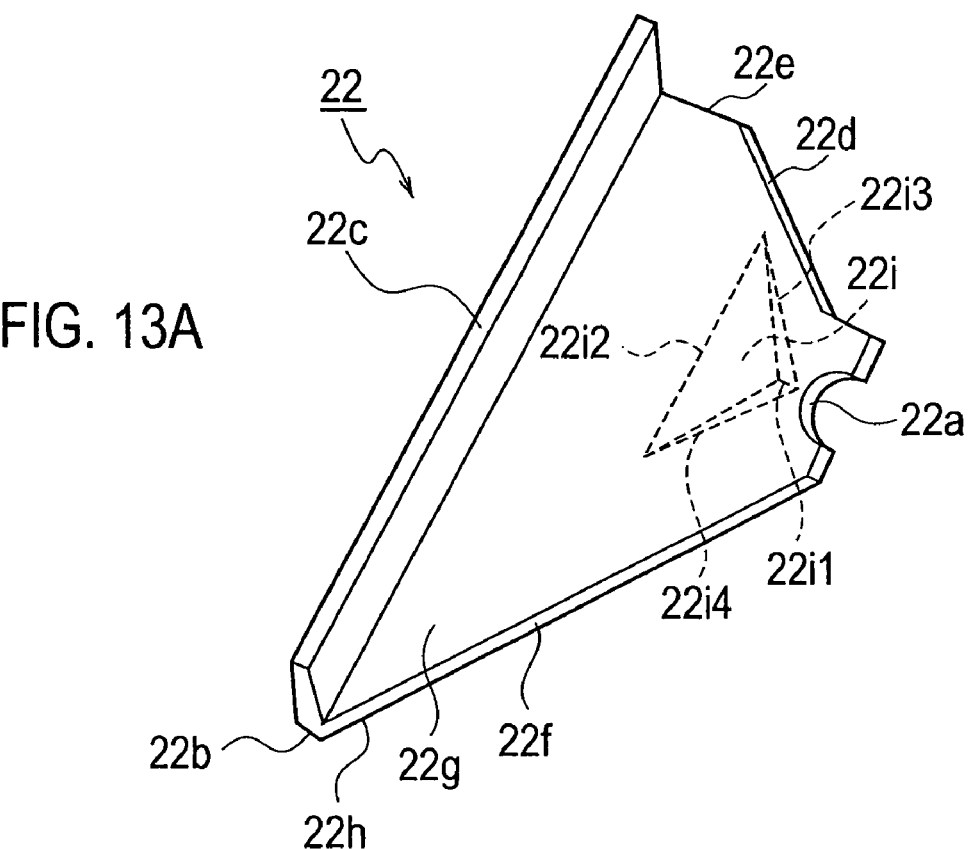
FIG. 13A is a perspective view of an upside of a light conducting plate constituting an essential portion of the indicator device according to the second embodiment of the present invention.

Description is now made of specific configuration of the indicator device 20 according to the second embodiment, with reference to FIGS. 12A, 12B, and 12C.

The LED 21 is driven, with the power button 4 (FIG. 11A, FIG. 11B) in an on state, to emit light, in red for example, substantially in an elliptically-deformed circular pattern based on the output light intensity characteristic shown in FIG. 5.

The light conducting plate 22 constituting an essential portion of the second embodiment is made by using an acrylic resin for example, in a configuration bent substantially in an L form including a flat planer portion having the light incidence surface 22a and an L-bent portion having the light output surface 22c, with the reflecting surface 22b in between, the flat planer portion having the light incidence surface 22a being configured in the form of a planer polygon, more specifically, substantially in a triangular plate form.

As shown in FIG. 12B, the light incidence surface 22a is semi-circularly recessed to form on a right side face (as one side face) of the light conducting plate 22, and the LED 21 is arranged opposite to the light incidence surface 22a, while the LED 21 has an optical axis K to be upwardly offset by a dimension h from a vertical center of the light conducting plate 22 to intersect at right angles with the light output surface 22c, and the light conducting plate 22 is formed vertically asymmetric with respect to the optical axis K of the LED 21.

Why the optical axis K of the LED 21 is upwardly offset in the light conducting plate 22 is in consideration of the LED 21 and the light conducting plate 22 to be both kept from contacting the volume control 5 (FIGS. 11A and 11B) attached to the front panel 3 (FIGS. 11A and 11B).

It is noted that for some component layouts on the front panel 3 (FIGS. 11A and 11B), the optical axis K of the LED 21 may be set to a vertical center of the light conducting plate 22 like the first embodiment.

Relative to the light incidence surface 22a of the light conducting plate 22, at the end of a left side face (as another side face) having a spaced position at a prescribed distance D therefrom, the reflecting surface 22b inclined at 45° is formed, extending in a vertical direction perpendicular to the optical axis K of the LED 21, and the light conducting plate 22 is bent substantially in an L form to extend frontward from the end of the left side face (as the other side face) to provide an end portion, where the light output surface 22c is formed as a narrow and elongate flat surface extending in the vertical direction perpendicular to the optical axis K of the LED 21.

The prescribed distance D is set to a value permitting emitted light from the LED 21 to be diffused inside the light conducting plate 22, the prescribed distance D being set to 42 mm or near, for example.

The light output surface 22c of the light conducting plate 22 has a thickness T3 set to be thinner than a thickness T2 at the end of the left side face (as the other side face) of the light conducting plate 22, and the thickness T2 at the end of the left side face (as the other side face) of the light conducting plate 22 is set to be thinner than a thickness T1 of the light incidence surface 22a formed at the end of the right side face (as one side face) of the light conducting plate 22, so that for rays of light having been emitted from the LED 21 and income through the light incidence surface 22a and outgoing though the light output surface 22c, flux of light can be narrowed in the light conducting plate 22 for a clear lighted indication.

The thickness T1 of the light incidence surface 22a is set to 3.7 mm for example, the thickness T2 at the end of the left side face (as the other side face), to 3.5 mm for example, and the thickness T3 of the light output surface 22c, to 3.1 mm for example, the thickness T3 of the light output surface 22c giving a width of the surface to be lighted by the light conducting plate 22 for indication on the front panel 3 (FIGS. 11A and 11B).

The height H of the light conducting plate 22 is set to a dimension approximately equal to the height of the front panel 3 (FIGS. 11A and 11B), it being set to 8.2 mm for example.

The light conducting plate 22 is formed, at the upper side with respect to the optical axis K of the LED 21, with a flat upper inclined side face 22d inclined at an inclination angle α to the optical axis K to have height-directional dimensions gradually increased as the light conducting plate 22 extends toward the light output surface 22c, and a horizontal side face 22e continuously connected to the inclined side face 22d and perpendicular to the light output surface 22c. The light conducting plate 22 is formed, at the lower side with respect to the optical axis K of the LED 21, with a flat lower inclined side face 22f that is inclined at an inclination angle β to the optical axis K to have height-directional dimensions gradually increased, as the light conducting plate 22 extends toward the light output surface 22c, and that is connected to the light output surface 22c.

The inclination angles α and β that the upper and lower inclined side faces 22d and 22f of the light conducting plate 22 have to the optical axis K of the LED 21 are set to 45° or near and 50° or near, for example, in correspondence to an outside emission angle where the LED 21 has an approximately half light intensity of output light intensity characteristic, and the offset dimension h of to the optical axis K of the LED 21, respectively.

The light conducting plate 22 has two surfaces intersecting at right angles with the right side face (as one side face) and the left side face (as the other side face), which constitute an upside 22g and a downside 22h each respectively formed as a flat planer surface.

The light conducting plate 22 has therein a triangular recess 22i recessed to form with recess depths within a thickness between the above-noted two sides being the upside 12g and the downside 12h, in one of the two sides 12g and 12h, e.g. the downside 12h, constituting a planer surface between the end of the light incidence surface 22a and the end of the light output surface 22c, for partially blocking and reflecting light from the LED 21 in accordance with the output light intensity characteristic (FIG. 5) of the LED 21, and directions in which rays of light from the LED 11 strike toward the end of the light output surface 22c, and the triangular recess 22i is disposed on the optical axis K of the LED 21, close to the light incidence surface 22a.

The triangular recess 22i recessed to form in the downside 22h of the light conducting plate 22 is formed as an essential portion of the second embodiment to partially block and reflect light of the LED 11 having income through the light incidence surface 22a, for light to be output from the light output surface 12b with a secured evenness of luminosity.

It is noted that light of the LED 21 having income through the light incidence surface 22a of the light conducting plate 22 has a fraction thereof passing inside the triangular recess 22i, which however is so small as negligible.

The triangular recess 22i recessed to form in the downside 22h of the light conducting plate 22 is formed to be vertically symmetric about the optical axis K of the LED 21, and as an equilateral-triangular recess.

The triangular recess 22i has a recess extremity 22i1 constituting a single vertex thereof disposed, as shown in FIGS. 12A and 12B, in position on the optical axis K of the LED 21 and nearer to the light incidence surface 22a than other vertices thereof, the recess extremity 22i1 being formed with a recess depth t1, and the triangular recess 22i has recess depths thereof made gradually shallower, as it extends from the recess extremity 22i1 toward an opposite side 22i2 thereof set, on the light output side, opposite to the recess extremity 22i1, at a distance off therefrom, till it has a zero depth t2 on the opposite side 22i2. In other words, the triangular recess 22i has, between the recess extremity 22i1 and the opposite side 22i2, an inside bottom thereof formed as a recess with an inclination to the direction of optical axis.

For the triangular recess 22i, the recess depth t1 at the recess extremity 22i1 is set in advance to a value that halves the light quantity of light from the LED 21 striking on the recess extremity 22i1 on the optical axis K of the LED 21. More specifically, the recess depth t1 at the recess extremity 22i1 is preset to a value around half the thickness T1 at the light incidence surface 22a.

The triangular recess 22i recessed to form in the downside 22h of the light conducting plate 22 thus has a recess depth t gradually decreasing in ratio (=t/T) to a thickness T of the light conducting plate 22, as it extends from the light incidence surface 22a side to the reflecting surface 22b and light output surface 22c side.

The triangular recess 22i has, as shown in FIG. 12B, two sides thereof being upper and lower recess side walls 22i3 and 22i4 respectively interconnecting the recess extremity 22i1 and the opposite side 22i2, and as shown in FIGS. 12A and 12B, the upper and lower recess side walls 22i3 and 22i4 are formed triangular, respectively, to have their optical reflectance values gradually decreased in proportion to recess depths, as they extend from the recess extremity 22i1, which has the recess depth t1, to the opposite side 22i2, which is formed opposite thereto at a distance off therefrom, with the recess depth t2 being a zero.

Further, for the triangular recess 22i, as shown in FIG. 12C that is a sectional view along the line X, the inside bottom is recessed to form in an arcuate shape, so the triangular recess 22i has therein, at an arbitrary position on the optical axis K of the LED 21, a recess depth tk a little deeper than respective recess depths ts of upper and lower recess side walls 22i3 and 22i4 corresponding thereto on both sides, thereby allowing for the upper and lower recess side walls 22i3 and 22i4 to have adjustable optical reflectance values, as will be described later on, while without restriction thereto it also is possible to have recess depths ts set equal to the recess depth tk.

In other words, for the upper and lower recess side walls 22i3 and 22i4, their recess depths at both sides in a vicinity of the recess extremity 22i1 are made substantially maximal, though shallower than at the recess extremity 22i1, and have maximal optical reflection values, which are set in the second embodiment to 45% or near for example, whereto the recess depths are set about 0.45T1 for the thickness T1 of the light incidence surface 22a, and the recess side walls 22i3 and 22i4 have gradually decreased optical reflection values, as they extend to the opposite side 22i2.

Figure 13B:
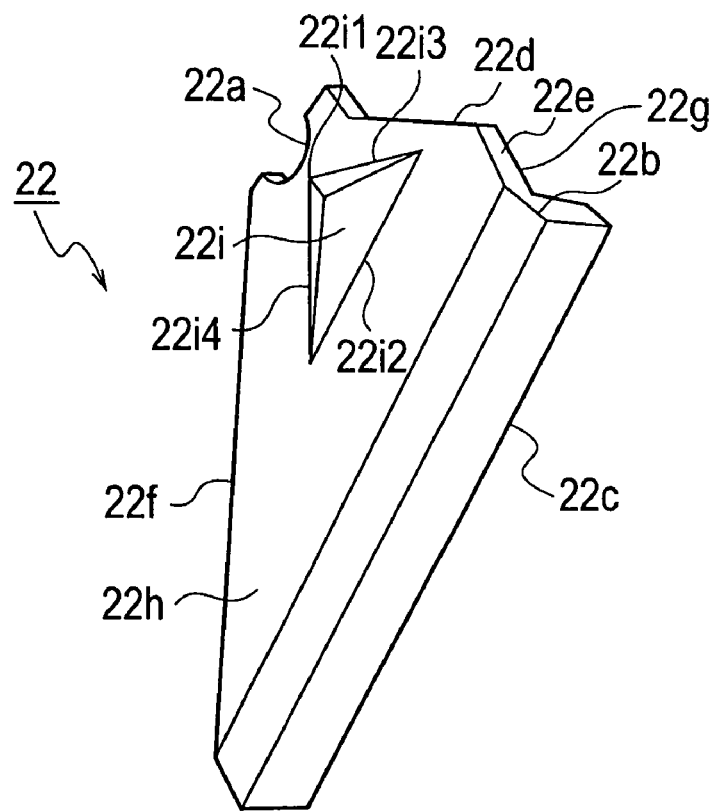
FIG. 13B is a perspective view of a downside of the light conducting plate according to the second embodiment.

The light conducting plate 22 is formed as described above, and looks as shown in FIG. 13A in a view of the upside 22g, or as shown in FIG. 13B in a view of the downside 22h.

Description is now made of actions of the indicator device 20 according to the second embodiment, with reference to FIGS. 12A to 12C.

Among rays of light emitted from the LED 21, rays L3 of light paraxial to the optical axis K of the LED 21 are strongest in light intensity, as will be seen from the output light intensity characteristic shown in FIG. 5 as well. Those rays L3 of light income, past the light incidence surface 22a of the light conducting plate 22, in position at the recess extremity 22i1 of the triangular recess 22i, where rays L3 of light greatest in light intensity are partly blocked from passing therethrough, and are halved in light quantity by the recess extremity 22i1, and remaining as-halved rays L3 of light (else than having struck on the recess extremity 22i1) pass along the optical axis K of the LED 21, through a portion at the side of the upside 22g in the back of the triangular recess 22i, to light a longitudinally upper corresponding region 22c3 of the light output surface 22c.

Among rays of light emitted from the LED 21, upper outer rays L1 of light are once reflected by a local region of the upper recess sidewall 22i3 of the triangular recess 22i having its optical reflectance value preset to 45% for example, to strike toward the upper inclined side face 22d, and are reflected by the inclined side face 22d toward the light output surface 22c, to light a region 22c1 in a vicinity of a longitudinally upper end of the light output surface 22c.

Among rays of light emitted from the LED 21, inner rays L2 of light relative to upper outer rays L1 of light pass through a portion at the side of the upside 22g in the back of the triangular recess 22i, without striking inside the triangular recess 22i, to light a corresponding local region 22c2 at the inner side of the region 22c1 of the light output surface 22c.

Among rays of light emitted from the LED 21, also lower rays L4 and L5 of light relative to the optical axis K of the LED 21 pass through corresponding portions at the side of the upside 22g in the back of the triangular recess 22i, without striking inside the triangular recess 22i, to light corresponding local regions 22c4 and 22c5 of the light output surface 22c lower than the optical axis K of the LED 21.

Among rays of light emitted from the LED 21, still lower rays L6 of light relative to rays L5 of light do strike as straight rays of light passing as they are below the lower recess side wall 22i4 of the triangular recess 22i, to light a corresponding local region 22c6 still lower than the region 22c5 of the light output surface 22c.

Among rays of light emitted from the LED 21, yet lower rays L7 of light relative to rays L6 of light are reflected by a local region of the lower recess side wall 22i4 of the triangular recess 22i having its optical reflectance value preset to 30% for example, and light a corresponding local region 22c7 yet lower than the region 22c6 of the light output surface 22c, while the region 22c7 is lighted also by rays L8 of straight light having straightly passed through the light conducting plate 22.

Among rays of light emitted from the LED 21, further lower straight rays L9 of light relative to rays L8 of light do light a local region 22c8 in a vicinity of a longitudinally lower end lower than the region 22c7 of the light output surface 22c, while lower outer rays L10 of light are once reflected by a local region of the lower recess side wall 22i4 of the triangular recess 22i having its optical reflectance value preset to 45% for example, to strike toward the lower inclined side face 22f, and are reflected by the inclined side face 22f, and light the region 22c8.

Those rays L1 to L10 of light described are emitted from the LED 21 in accordance with an output light intensity characteristic illustrated by using FIG. 5, but in unison with the output light intensity characteristic, those rays L1 to L10 of light are blocked to reflect in part by the triangular recess 22i formed in the light conducting plate 22, thereby permitting the light output surface 22c to gleam for a clear lighted indication substantially with an even brightness without optical spots, encompassing respective longitudinal regions 22c1 to 22c8 of the light output surface 22c, thus preventing occurrences of a phenomenon on the light output surface 22c, where this would get dark in vicinities of both longitudinal ends thereof as was observed in the third and the fourth example in the past described with reference to FIGS. 3A and 3B and FIG. 4, that is, allowing for a secured evenness of luminosity of light over the light output surface 22c, together with provision of the indicator device 20 according to the second embodiment with a favorable quality of lighted indication in respect of a design, as well.

It is noted that the opposite side 22i2 of recess 22i can do without extending straight, and may be arcuate, for example. That is, the recess 22i may well be any V form recess defined by a pair of recess side walls 22i3 and 22i4 and an arbitrary bottom wall for interconnection in between, like the recess 12g (FIGS. 7A, 7B, and 7C) in the first embodiment.

Description is now made of a first and a second modification as partial modifications of the second embodiment of the present invention, with reference to FIG. 14A, FIG. 14B and FIG. 15A, FIG. 15B.

Figures 14A, 14B:
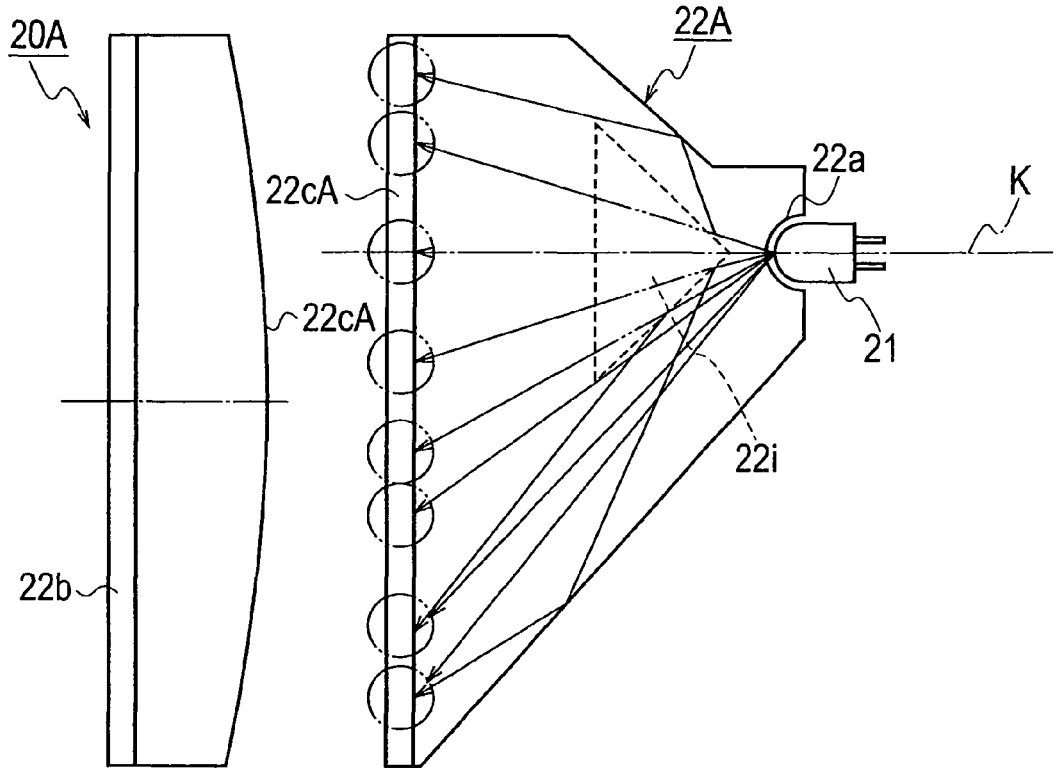
FIG. 14A is a left side view of an indicator device according to a first modification as a partial modification of the second embodiment of the present invention.
FIG. 14B is a front view of the indicator device according to the first modification as the partial modification of the second embodiment.
Figures 15A, 15B:
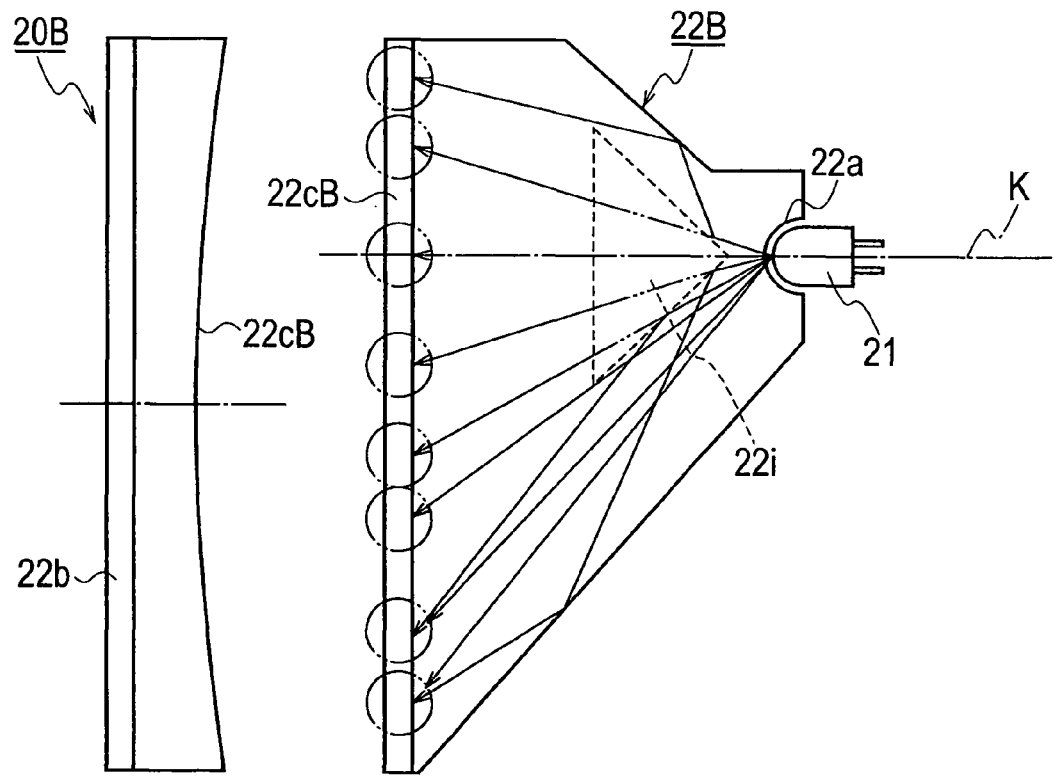
FIG. 15A is a left side view of an indicator device according to a second modification as a partial modification of the second embodiment of the present invention.
FIG. 15B is a front view of the indicator device according to the second modification as the partial modification of the second embodiment.

FIG. 14A is a left side view of an indicator device 20A according to the first modification as a partial modification of the second embodiment, and FIG. 14B, a front view of the same. FIG. 15A is a left side view of an indicator device 20B according to the second modification as a partial modification of the second embodiment, and FIG. 15B, a front view of the same.

As shown in FIGS. 14A and 14B, the indicator device 20A according to the first modification as a partial modification of the second embodiment is made up by an LED 21, and a light conducting plate 22A made substantially in an L-bent form by using a transparent acrylic resin, polycarbonate resin, or the like, for conducting therein light emitted from the LED 21. The first modification is different from the second embodiment simply in that the light conducting plate 22A has a light output surface 22cA configured as a convex curved surface made in a convex form with a prescribed curvature along a longitudinal direction thereof. The convex curved surface has a center thereof set on a longitudinal centerline of the light conducting plate 22A.

As shown in FIGS. 15A and 15B, the indicator device 20B according to the second modification as a partial modification of the second embodiment is made up by an LED 21, and a light conducting plate 22B made substantially in an L-bent form by using a transparent acrylic resin, polycarbonate resin, or the like, for conducting therein light emitted from the LED 21. The second modification is different from the second embodiment simply in that the light conducting plate 22B has a light output surface 22cB configured as a concave curved surface made in a concave form with a prescribed curvature along a longitudinal direction thereof. The concave curved surface has a center thereof set on a longitudinal centerline of the light conducting plate 22B.

The indicator device 20A according to the first modification, as well as the indicator device 20B according to the second modification, as a partial modification of the second embodiment has like functions to the second embodiment, thereby allowing for a secured evenness of luminosity of light over the light output surface 22cA made as a convex curved surface in the light conducting plate 22A, as well as over the light output surface 22cB made as a concave curved surface in the light conducting plate 22B.

According to the foregoing embodiments and modifications thereof, a triangular recess {(12g) or (22i)} is formed with two recess side walls {(12g3, 12g4) or (22i3, 22i4)} that have a smaller (shallower) depth in a thickness direction thereof, as they extend farther off from an LED {(11) or (21)} constituting a light source, whereby the two recess side walls are adapted to reflect a smaller quantity of light by regions thereon farther off from the light source.

In other words, for those parts of a light output surface {(12b) or (22c)} having the more decreased light quantities as being farther from an optical axis K, in order to conduct thereto light quantities to balance out their decreased fractions, the quantity of paraxial light along the optical axis of a light source is halved, and the amount of reflection is increased as being nearer to the light source.

Further, as the more reflected the more decreased is the quantity of light straightly arriving at the light output surface without being blocked by the triangular recess, as being nearer to the optical axis K, the light output surface has quantities of lighting light extremely favorably equalized to be even in luminance, despite distances from the optical axis.

As will be seen from the foregoing description, according to the embodiments of the present invention described, for provision of an indicator device in which output light from a light emitting element is let to strike on a light incidence surface formed on a side face of a light conducting plate, where it is conducted inside the light conducting plate, and is let to outgo through a light output surface formed, narrow in width and elongate, on another side face having a prescribed spaced position relative to the light incidence surface, thereby allowing for the light output surface to be clearly lighted for indication: the light conducting plate has a V-form recess (as a triangular recess when a proximal end part as a common end part between two sides of the V-form and distal end parts of the two sides are interconnected by straight three sides), which is recessed to form with prescribed recess depths in one of two planer surfaces intersecting at right angles with the above-noted side face between the light incidence surface and the light output surface and configured for light from the light emitting element to be reflected in part; the V-form recess having a recess extremity (as the proximal end part) constituting a single vertex thereof disposed in position on the optical axis of the light emitting element and nearer to the light incidence surface than other end parts (as the distal end parts of two sides) of the V-form recess, and the recess depths becoming shallower as the V-form recess extends from the recess extremity; the V-form recess being formed in a V form defined with recess side walls as two sides thereof interconnecting the recess extremity and the other end parts, respectively, the recess sidewalls having recess depths becoming smaller as the recess side walls extend from the recess extremity, with resultant effects such that light from the light emitting element is partially blocked and reflected by the V-form recess formed in the light conducting plate, whereby the light output surface can be clearly lighted for indication, and luminous without optical spots, substantially with an even luminosity over respective regions in a longitudinal direction of the light output surface, thus successfully preventing occurrences of a phenomenon on the light output surface, where this would get dark in vicinities of both longitudinal ends thereof, that is, allowing for a secured evenness of luminosity of light over the light output surface, together with provision of an indicator device with a favorable quality of lighted indication in respect of a design, as well.

While preferred embodiments of the present invention have been described using specific terms, such description is for illustrative purposes, and it is to be understood that changes and variations may be made without departing from the spirit or scope of the following claims.

What is claimed is:
1. An indicator device comprising:
   a light emitting element configured for emission of light; and
   a light conducting plate comprising:
      a light incidence surface formed on a side face opposite to the light emitting element and configured for light from the light emitting element to strike thereon,
      a light output surface formed on another side face opposite to the side face and having a prescribed spaced position relative to the light incidence surface to be narrow in width and elongate in a direction perpendicular to an optical axis of the light emitting element and configured for light having income to outgo for a lighted indication;
      a V-form recess recessed to form with prescribed recess depths in one planer surface of two planer surfaces intersecting at right angles with the side face between the light incidence surface and the light output surface and configured for light from the light emitting element to be reflected in part, and
      a pair of side faces linking the side face to the another side face and formed to sandwich the optical axis therebetween and be inclined in a direction apart from each other as the pair of side faces extends from side face toward the another side face,
   wherein the V-form recess has a recess extremity constituting a single vertex thereof disposed in position on the optical axis of the light emitting element and nearer to the light incidence surface than other end parts thereof,
   wherein the recess depths become shallower as the V-form recess extends from the recess extremity, wherein the V-form recess is formed in a V-form defined with recess side walls as two sides thereof interconnecting the recess extremity and the other end parts, respectively, and wherein the recess side walls are configured for light from the light emitting element to be reflected in part such that the light reflected in part is reflected on the pair of side faces to reach the light output surface.

2. The indicator device according to claim 1, wherein the recess side walls have recess depths becoming smaller as the recess side walls extend from the recess extremity.

3. An indicator device comprising:

a light emitting element configured for emission of light; and a light conducting plate comprising:

a light incidence surface formed on a side face opposite to the light emitting element and configured for light from the light emitting element to strike thereon, a light output surface formed on another side face having a prescribed spaced position relative to the light incidence surface to be narrow in width and elongate in a direction perpendicular to an optical axis of the light emitting element and configured for light having income to outgo for a lighted indication, a V-form recess recessed to form with prescribed recess depths is one planer surface of two planer surfaces intersecting at right angles with the side face between the light incidence surface and the light output surface and configured for light from the light emitting element to be reflected in part, and a pair of side faces linking the side face to the another side face and having a portion formed to sandwich the optical axis therebetween and be inclined in a direction apart from each other as the pair of side faces extends from the side face, wherein the light output surface is formed on an end part of a bent portion bent in an L form at an end of the other side face having the prescribed spaced position relative to the light incidence surface of the light conducting plate, wherein the V-form recess has a recess extremity constituting a single vertex thereof disposed in position on the optical axis of the light emitting element and nearer to the light incidence surface than other end parts thereof, wherein the recess depths become shallower as the V-formed recess extends from the recess extremity, wherein the V-form recess is formed in a V form defined with recess side walls as two sides thereof interconnecting the recess extremity and the other end parts, respectively, and wherein the recess side walls are configured for light from the light emitting element to be reflected in part such that the light reflected in part is reflected on the pair of side faces to reach the light output surface.

4. The indicator device according to claim 1, wherein the light output surface comprises one of a flat surface made longitudinally flat, a concave curved surface made longitudinally concave with a prescribed curvature, and a convex curved surface made longitudinally convex with a prescribed curvature.

5. The indicator device according to claim 1, wherein the V-form recess is configured to block more light from the light emitting element, as being closer to the optical axis, and reflect a greater light quantity of light reflected and conducted toward the light output surface, as being reflected and conducted farer from the optical axis at the light output surface.

6. The indicator device according to claim 1, wherein the V-form recess is a triangular recess.

* * * * *